May 31, 1938.   A. N. SPÁNEL   2,119,499
FORM FOR MAKING LATEX ARTICLES
Original Filed Feb. 27, 1936   3 Sheets-Sheet 3
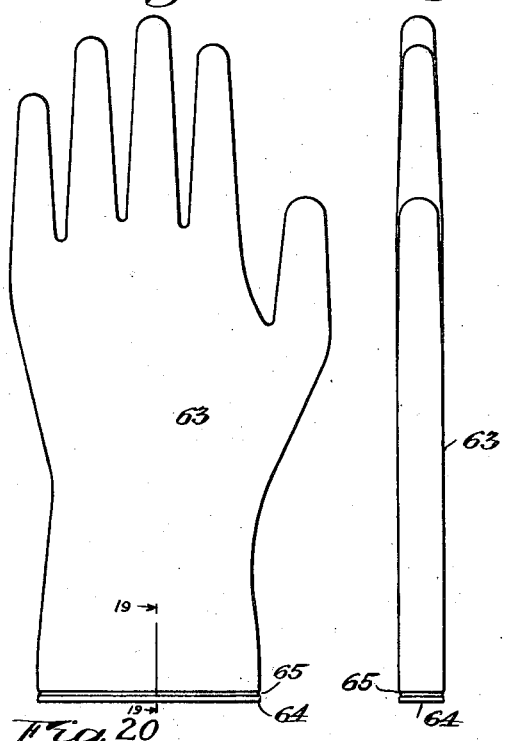
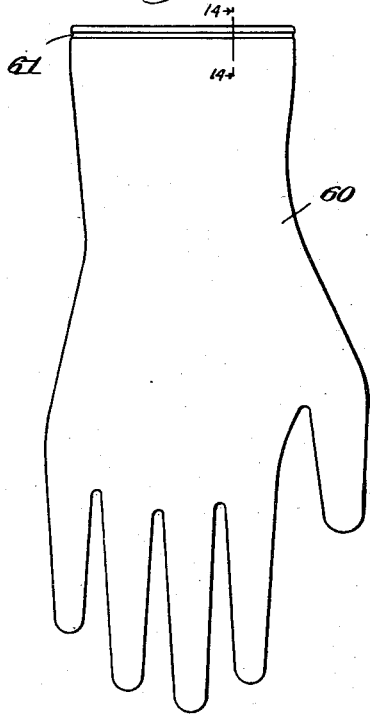
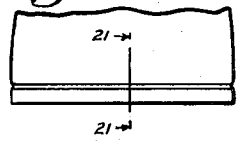
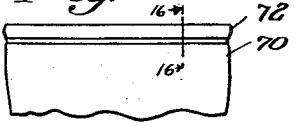
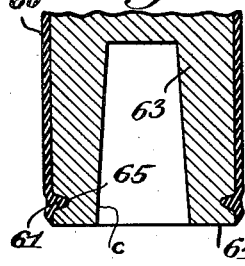
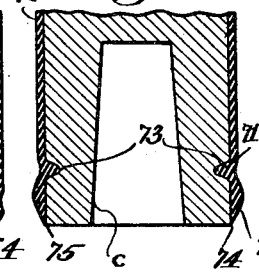
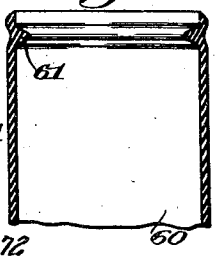
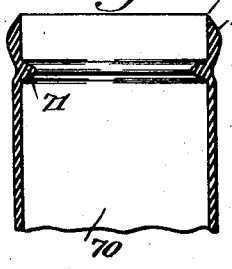
INVENTOR.
Abraham N. Spanel.
BY D. Clyde Jones
ATTORNEYS.

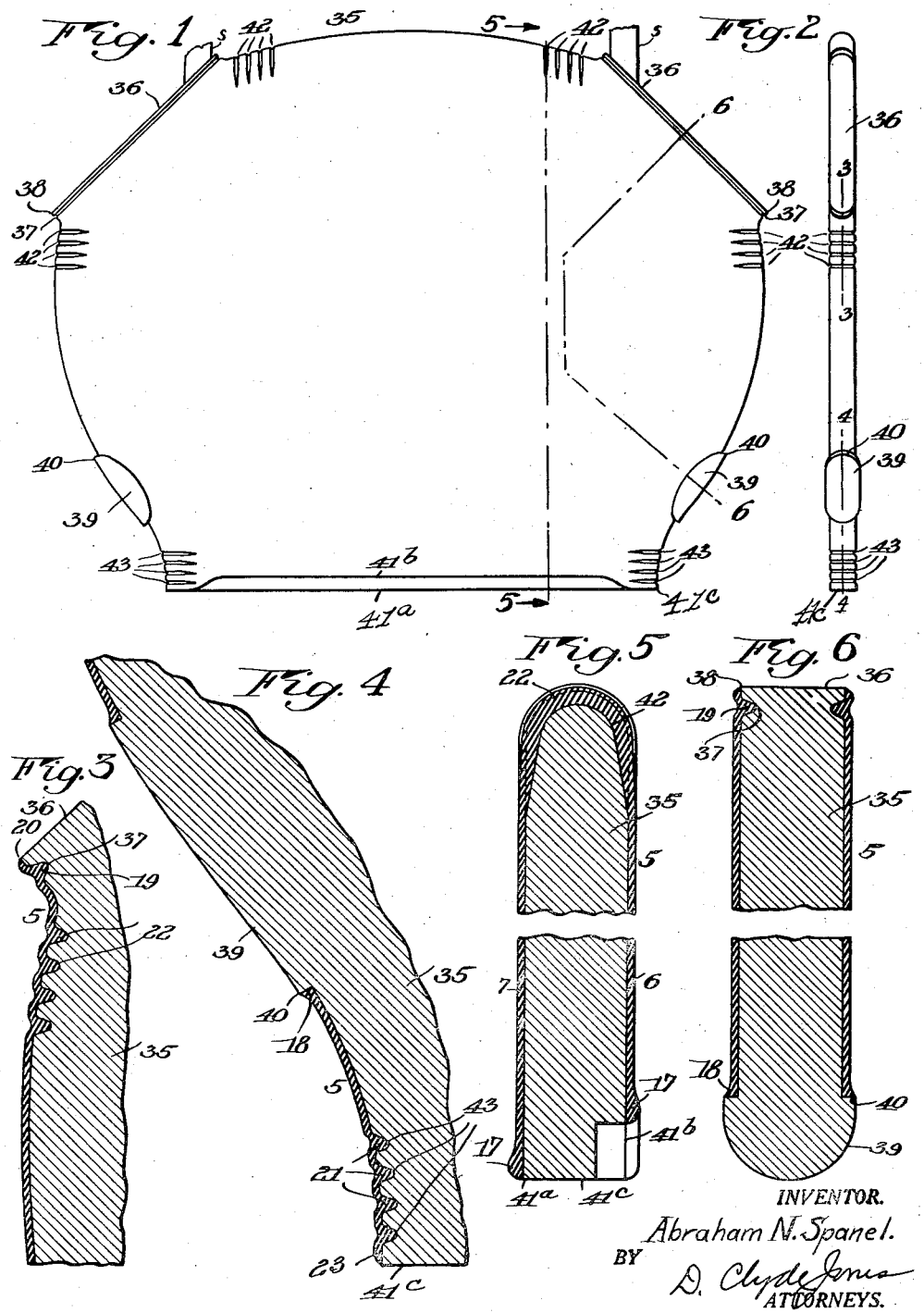

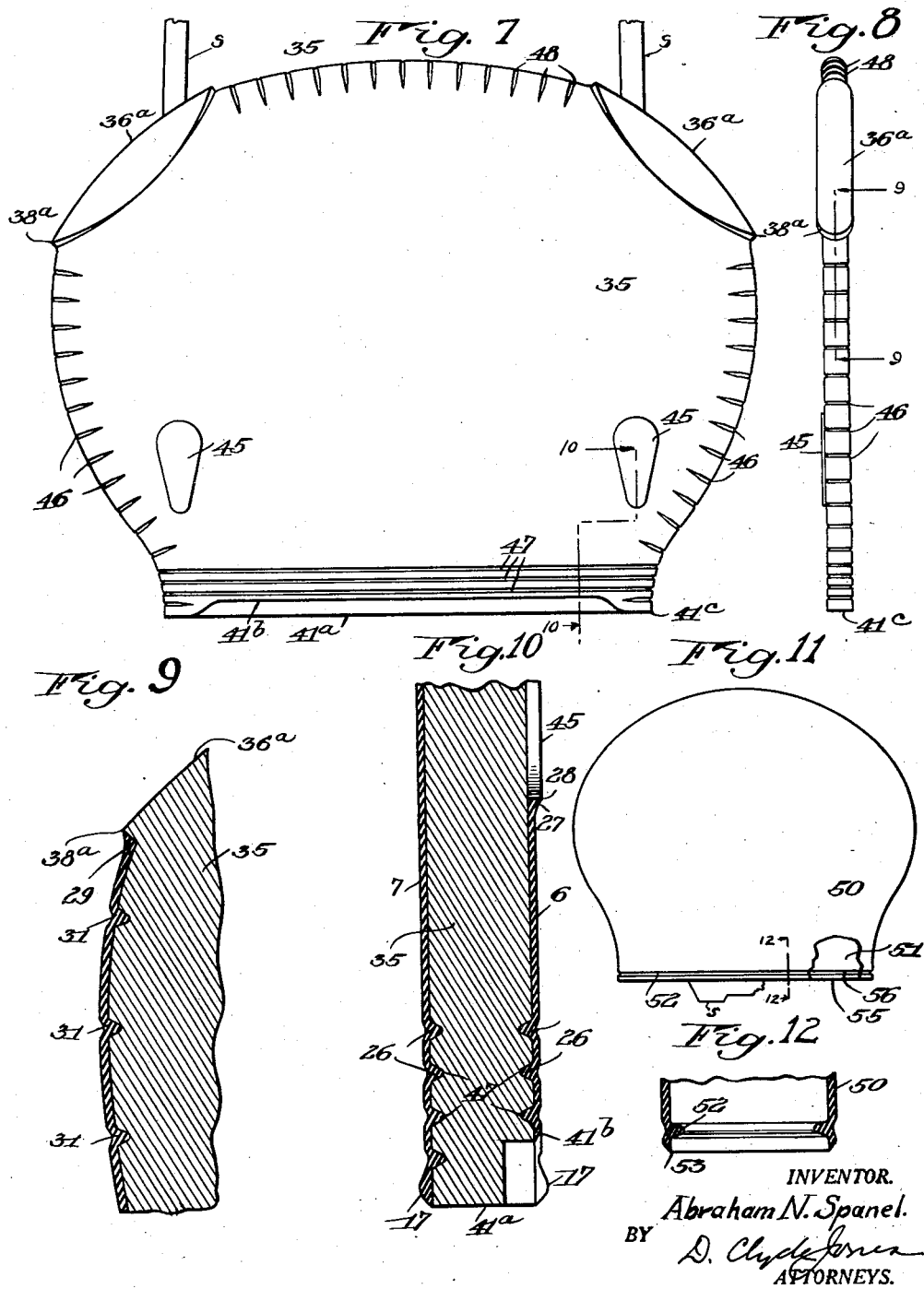

Patented May 31, 1938

2,119,499

UNITED STATES PATENT OFFICE 2,119,499

FORM FOR MAKING LATEX ARTICLES

Abraham N. Spánel, Dover, Del.

Original application February 27, 1936, Serial No. 66,045. Divided and this application October 12, 1937, Serial No. 168,633

5 Claims. (Cl. 18—41)

This invention relates to forms for making latex articles.

This application is a division of applicant's copending application, Serial No. 66,045, filed Feb. 27, 1936.

In the manufacturing of deposited latex or rubber articles, it is essential that the margins thereof be reinforced without having the reinforcement bulky or unsightly.

A main feature of the present invention relates to the provision of a form having novel double reinforcement-generating means for the margin of the article.

Another feature of the invention relates to the provision of a reinforcement-generating groove adjacent an abrupt edge of a form on which latex or rubber articles are made whereby an extremely thin or membranous layer of rubber will be deposited at the abrupt edge of the form and thereby facilitate removal of the excess or waste rubber from the article deposited on the form.

Another feature of the invention relates to a form for making a hollow rubber article in which the curved side edges of the article are reinforced by integral ridges of latex.

Still another feature of the invention relates to the provision of a form on which a novel type of margin for the waist opening and the like in a latex garment can be deposited.

A further feature of the invention relates to novel forms on which the reinforced margins and the reinforced curved edges of latex or rubber articles can be deposited.

An additional feature of the invention relates to novel forms on which a hollow latex article having openings therein defined by reinforced margins with reentrant or concave outlines extending into the body of the article thereby giving the wearer maximum protection with a minimum amount of latex material can be deposited.

The other features and advantages of the invention will appear from the detailed description and claims when taken with the drawings in which—

Fig. 1 is a front view and

Fig. 2 is an edge view of a form on which rubber or latex pants can be deposited;

Fig. 3 is an enlarged cross sectional view taken on the line 3—3 of Fig. 2 also showing a layer of latex on the form as deposited during the making of the pants;

Fig. 4 is an enlarged cross sectional view taken substantially on the line 4—4 of Fig. 2 also showing thereon a layer of latex in the position in which it is deposited on the form;

Fig. 5 is an enlarged fragmentary cross sectional view taken substantially on the line 5—5 of Fig. 1 particularly illustrating the offset relation of certain of the edges of the forms at the waist opening, which form has a layer of deposited latex thereon;

Fig. 6 is an enlarged fragmentary cross sectional view taken substantially on the line 6—6 of Fig. 1 with a layer of latex thereon illustrating how the reinforcement of the leg opening and the reinforcement for the ventilating opening is developed in the deposited layer;

Fig. 7 is a front view, and

Fig. 8 is an edge view of a form on which a different type of pants can be deposited;

Fig. 9 is an enlarged sectional view taken on the line 9—9 of Fig. 8 with a layer of latex thereon to illustrate how the material at each margin of the leg opening and at the curved edge of the pants are reinforced;

Fig. 10 is an enlarged cross sectional view taken on the line 10—10 of Fig. 7 with a layer of latex thereon disclosing how the reinforcement for the margin of the pants at the ventilating opening and the margin of the pants at the waist opening therein, is developed;

Fig. 11 illustrates a front elevation of a form with a bathing cap deposited thereon, a portion of said cap being broken away to disclose the form, showing how the present invention can be applied to the manufacture of bathing caps;

Fig. 12 is a section through the cap only, taken on the line 12—12 of Fig. 11;

Fig. 13 is a front view of a latex glove made in accordance with the present invention;

Fig. 14 is an enlarged cross sectional view of said glove taken substantially on the line 14—14 of Fig. 13;

Fig. 15 is a fragmentary view of the cuff portion of a modified type of glove;

Fig. 16 is an enlarged cross sectional view thereof taken on the line 16—16 of Fig. 15 illustrating the character of reinforcement for the margin and for the edge of the cuff at the opening in the glove;

Fig. 17 is a front elevation and

Fig. 18 is an edge elevation of a form on which the glove of Figs. 13 and 14 can be deposited;

Fig. 19 is an enlarged cross sectional view of this form taken on the line 19—19 of Fig. 17;

Fig. 20 is a fragmentary front view of a form on which the glove of Figs. 15 and 16 can be deposited; and Fig. 21 is an enlarged cross sectional view thereof taken on the line 21—21 of Fig. 20.

In Figs. 1 to 6 there is illustrated a form on which pants may be made by depositing an aqueous dispersion of rubber thereon. This form, which has the general outline of the pants to be deposited thereon, is provided with raised bosses 36 defined by a groove 37 at the junction between the boss and the body of the form. Each boss preferably terminates in an abrupt edge 38 to define a leg opening in the deposited garment. On each side edge of the form there is provided a boss 39 of generally elliptical outline which boss terminates in an abrupt edge 40 to define a ventilating opening in the deposited garment. The lower part of the form, which generates the waist opening in the deposited pants, terminates in an abrupt edge, the rear portion 41a of this edge extending beyond the front portion 41b thereof. It will be noted that the portion 41a of this edge extends not only in the rear of the form but also around the side edges thereof as indicated at 41c.

It has been discovered that when latex is deposited on a curved surface of relatively small radius, the deposited latex layer tends to be thinner than a corresponding layer deposited on a flat surface of the form. For this reason it has been necessary in the past to make the forms relatively thick so that there would not be an objectionable difference in thickness between the portion of the garment on the curved edge of the form and that on the flat surface thereof. Obviously, a given number of such thick forms displace a correspondingly larger amount of the latex bath than an equal number of thin forms thereby requiring a larger quantity of the latex and a larger receptacle to hold it. Also such thick forms are awkward to handle because of their greater bulk. In accordance with the present invention it is proposed to provide sets of grooves 42 on the curved edge of the form adjacent each of the bosses 36 so that reinforcing ridges 22 are deposited in the latex layer, as indicated in Fig. 3, to reinforce the side edge of the garment where there is a tendency for weakness to develop therein. Similarly, the curved edge of the form adjacent the portion thereof which develops the waist opening, is provided with sets of grooves 43 in which the reinforcing ribs 21 can be deposited.

In making a pair of pants on this form, latex is deposited thereon while the form is supported vertically with its edge 41a, 41b and 41c in the lowermost position. While the latex may be deposited on the form in various ways, it is preferred to dip the same into a bath of an aqueous dispersion of rubber. The form may be preferably dipped several times with a drying or setting interval between each dip. When a layer of latex of the desired thickness has been deposited on the form, this layer is permitted to "set". It will be appreciated that during the dipping operations, the latex will accumulate in the groove 37 adjacent the boss 36, while at the abrupt edge 38 of this boss, a line of weakness will develop in this layer. Similarly, the latex will accumulate in the grooves 42 and 43. Also at the junction between the boss 39 and the body of the form, the latex will accumulate as indicated at 18 in Fig. 6, while at the abrupt edge 40 of the boss the layer will develop a line of weakness. Above the portions 41a and 41b of the abrupt edge of the form, the latex will accumulate as a ridge 17 (Fig. 5). It should be noted that at the portion 41c of the abrupt edge, the latex layer will have a thickness approximately equal to that of the body of the pants or less, as indicated at 23 in the lower part of Fig. 4. If the spacing between the lowermost groove 43 and the portion 41c of the abrupt edge is relatively narrow, then the margin below groove 43 will be equal to or less in thickness than the main layer of the garment. However, if the above mentioned spacing is relatively wide, a reinforcing ridge similar to 17 will be developed. This is due to the fact that the latex accumulates in the grooves 43 which prevent a build-up or increased thickness of this portion of the edge. However, at the abrupt edge itself the layer of latex will be extremely thin resulting in a line of weakness. When the deposited layer is properly "set", the excess portions thereof on the face of the bosses 36 are stripped away as far as the line of weakness at the abrupt edge 38 leaving a thin edge. Similarly, on the faces of the bosses 39, the excess portion of the layer is torn away as far as the abrupt edges 40. Likewise, on the lower end of the form the excess portion of the layer is torn away as far as the abrupt edge having the portions 41a, 41b and 41c. After the pants are vulcanized they are removed from the form and prepared for sale in the usual manner.

In Figs. 7 to 10 there is illustrated a form on which a modified type of pants may be made by depositing an aqueous dispersion of rubber thereon. The parts of this form, which are identical with that just described are designated by the same reference characters. This form differs from that already described in that the bosses 36a which define the leg openings, are generally elliptical and project from the body of the form to an abrupt edge 38a. The ventilating bosses on the side edge of the form have been omitted and instead rounded or oval shaped bosses 45 are provided on the front surface of the form. Each of these bosses which project from the form, terminates in an abrupt edge. Also instead of providing the short grooves 43 adjacent the abrupt lower edge of the form, there are provided a series of parallel grooves 47 which, with the exception of the lowermost groove, encircle the form in substantially parallel relation to the abrupt lower edge thereof having the portions 41a, 41b and 41c. The curved edge of the form between bosses which define the leg openings, is provided with a series of transverse grooves 48 which are preferably uniformly spaced from each other. Likewise, each edge of the form between the leg defining bosses and the abrupt lower edge are similarly provided with transverse grooves 46 which are also preferably spaced an equal distance from each other.

The method of making a garment on this form is similar to that already described and need not be repeated except to state that the latex accumulates as ridges 31 and 26 in the grooves 46, 47 and 48. It should be noted that at the portion 41b, the latex layer will have a thickness approximately equal to that of the body portion of the pants or less as indicated in Fig. 10. At the junction of the boss 36a with the body of form (Fig. 9), the latex will accumulate as a generally triangular reinforcement 29 with a thin boundary at the abrupt edge 38a. Similarly at the junction of each boss 45 with the form, the latex will also accumulate as a triangular reinforcement 27 (Fig. 10) with a thin boundary at the abrupt edge of the boss. When the layer has suitably dried or set on the form the excess portions of the layer (not shown) on the faces of the bosses 36a and 45 as well as on the lower end of the form are stripped away as previously set forth.

This invention is also applicable to the making of latex bathing caps, such a cap 50 being illustrated in Fig. 11 where it is shown in the position in which it is deposited on the form 51. This cap is provided with a reinforcing rib 52 adjacent its edge 53 at the opening therein. It should be noted that a portion of the cap below the rib 52 tapers to edge 53.

This cap is also made by depositing a layer of an aqueous dispersion of rubber on the form 51 which has the general outline of the desired cap. This form terminates in an abrupt edge 55 at the bottom of the form which develops a line of weakness in the deposited latex layer on the form so that the excess portion of layer can be stripped or torn away at this end. Adjacent this abrupt edge there is provided a groove 56 encircling the form.

The present invention is also applicable to the making of latex gloves such as 60 illustrated in Figs. 13 and 14. This glove is provided with a reinforcing rib 61 encircling the margin of the cuff.

This glove can preferably be made by depositing the latex on a form 63 illustrated in Figs. 17, 18 and 19. This form which has the general shape of a hand, terminates at its lower end in an abrupt edge 64. Adjacent this abrupt edge there is provided a groove 65 cut into and encircling the form.

The glove is made by depositing latex on the form while it is supported in a vertical position with its abrupt edge in the lower position. In the course of depositing the latex on this form, a layer of latex develops uniformly over the surface of the form but accumulates in the groove 65 as a reinforcing rib 61. However, a line of weakness develops in the layer at the abrupt edge 64 of the form. When the layer has "set", the excess portion thereof on the lower end of the form is stripped away as far as this line. The glove, when vulcanized, may be removed from the form.

In Figs. 15 and 16, there is illustrated a fragment of a modified type of glove 70 in which the margin of the cuff is reinforced, not only by a rib 71, but also by a ridge 72 which terminates at a torn or thin edge 74. This ridge together with the rib 71 provides a double reinforcement which serves to increase the strength of the glove at the opening therein.

This modified type of glove can be made on a form similar to that illustrated in Figs. 17, 18 and 19 when modified as indicated in Figs. 20 and 21. In this instance a groove 73 in the lower portion of the form is spaced a distance sufficient from the abrupt edge 74 of the form so that the reinforcement 72 can be developed.

The forms 35 illustrated in Figs. 1 and 7 are provided with supports 5 whereby the forms may be suspended from a suitable dipping rack (not shown), with the abrupt edge defining the waist opening lowermost. The form 50 may also be supported with its abrupt edge 55 lowermost, by means of the depending fin or support "S" secured to the bottom surface of the form. The glove forms 63 are provided with recesses "C" which receive upwardly extending bosses or supports of a dipping rack (not shown).

The present disclosure is given merely by way of example and it will be understood that there can be many modifications and variations therein within the scope of the appended claims without departing from the spirit of the present invention.

What I claim is:

1. A form for making seamless, deposited rubber pants, said form comprising a relatively thin member having the general outline of the pants to be deposited thereon, leg-opening defining portions and a waist-opening defining portion provided on said member, the edges of said member between the leg-opening defining portions and between said last mentioned portions and the waist-opening defining portions being rounded, certain of said rounded edges having a plurality of spaced reinforcement-generating grooves formed therein, each groove extending substantially across an edge only.

2. A form for making seamless, deposited rubber pants, said form comprising a relatively thin member having the general outline of the pants to be deposited thereon, leg-opening defining portions and a waist-opening defining portion provided on said member, the edge of said member between the leg-opening defining portions being rounded, said rounded edge having a plurality of spaced reinforcement-generating grooves formed therein, each groove extending substantially across an edge only.

3. A form for making seamless, deposited rubber pants, said form comprising a relatively thin member having the general outline of the pants to be deposited thereon, leg-opening defining portions and a waist-opening defining portion provided on said member, the edges of said member between the leg-opening defining portions and the waist-opening defining portion being rounded, said rounded edges having a plurality of spaced reinforcement-generating grooves formed therein, each groove extending substantially across an edge only.

4. A form for making a deposited rubber article having the general shape of said article, said form being provided with an abrupt edge at a portion thereof where an edge is desired on said article, said form having a reinforcement-generating groove therein spaced from but adjacent to said abrupt edge, the surface of said groove merging gradually with the surface of said form at each side of said groove, the portion of said surface of the form at one side of said groove extending in the same general direction as the surface of the form at the other side of said groove.

5. A form for making a deposited rubber article having the general shape of said article, said form being provided with an abrupt edge at a portion thereof where an edge is desired on said article, said form having a reinforcement-generating groove therein spaced from but immediately adjacent to said abrupt edge, the surface of said groove merging gradually with the surface of said form at each side of said groove, the portion of said surface of the form at one side of said groove extending in the same general direction as the surface of the form at the other side of said groove, and means for supporting said form with the abrupt edge lowermost.

ABRAHAM N. SPÁNEL.